United States Patent
Chen et al.

(10) Patent No.: US 11,615,189 B2
(45) Date of Patent: Mar. 28, 2023

(54) UPDATE OF GATEWAY IN SUBSTATION

(71) Applicant: ABB Schweiz AG, Baden (CH)

(72) Inventors: Huixiang Chen, Zhangzhou (CN);
Zhui Wang, Xiamen (CN); Hongzheng Chen, Xiamen (CN)

(73) Assignee: ABB SCHWEIZ AG, Baden (CH)

( * ) Notice: Subject to any disclaimer, the term of this patent is extended or adjusted under 35 U.S.C. 154(b) by 337 days.

(21) Appl. No.: 16/886,048

(22) Filed: May 28, 2020

(65) Prior Publication Data

US 2020/0293660 A1 Sep. 17, 2020

Related U.S. Application Data

(63) Continuation of application No. PCT/CN2017/113792, filed on Nov. 30, 2017.

(51) Int. Cl.
*G06F 21/57* (2013.01)
*G06F 8/65* (2018.01)
(Continued)

(52) U.S. Cl.
CPC .............. *G06F 21/572* (2013.01); *G06F 8/65* (2013.01); *G06F 8/71* (2013.01); *G06F 11/362* (2013.01); *G06F 21/57* (2013.01); *H04L 12/66* (2013.01); *H04L 63/10* (2013.01); *H04L 67/01* (2022.05); *G06F 2221/033* (2013.01)

(58) Field of Classification Search
CPC ................... G06F 21/57; G06F 21/572; G06F 2221/033
See application file for complete search history.

(56) References Cited

U.S. PATENT DOCUMENTS 7,757,276 B1 * 7/2010 Lear ...................... G06F 21/572
726/10
9,372,731 B1 6/2016 Marr et al.
(Continued)

FOREIGN PATENT DOCUMENTS

CN 102035887 A 4/2011
CN 102739484 A 10/2012
(Continued)

OTHER PUBLICATIONS

European Patent Office, Extended Search Report issued in corresponding Application No. 17933392.7, dated Apr. 21, 2021, 10 pp.
(Continued)

*Primary Examiner* — Daniel B Potratz
(74) *Attorney, Agent, or Firm* — Greenberg Traurig, LLP

(57) ABSTRACT

In some embodiments, there is provided a method for updating a gateway in a substation. The method includes receiving, at a gateway from a server, an update package assigned with a first identifier, the update package including at least one of: a configuration associated with at least one monitoring device connected to the gateway; and an application configurable to collect data from the at least one monitoring device; in response to receiving the update package, determining whether the first identifier matches a second identifier of the gateway; and in response to determining that the first identifier matches the second identifier of the gateway, updating the gateway with the received update package.

14 Claims, 3 Drawing Sheets

(51) Int. Cl.
*G06F 8/71* (2018.01)
*G06F 11/36* (2006.01)
*H04L 12/66* (2006.01)
*H04L 9/40* (2022.01)
*H04L 67/01* (2022.01)

(56) References Cited

U.S. PATENT DOCUMENTS

| | | |
|---|---|---|
| 2002/0095487 A1 | 7/2002 | Day et al. |
| 2003/0184936 A1 | 10/2003 | Wimmer et al. |
| 2009/0182955 A1 | 7/2009 | Cherukuri |
| 2014/0052976 A1* | 2/2014 | Marino .................. G06Q 10/00 713/2 |
| 2014/0195844 A1* | 7/2014 | Laval ................. G05B 23/0272 713/340 |
| 2014/0196117 A1 | 7/2014 | Schwebke et al. |
| 2016/0196132 A1 | 7/2016 | Searle et al. |
| 2017/0005861 A1 | 1/2017 | Strandzhev et al. |
| 2017/0010881 A1* | 1/2017 | Kawazu .................. G06F 8/654 |
| 2017/0205791 A1* | 7/2017 | Yang ........................ D06F 37/04 |

FOREIGN PATENT DOCUMENTS

| | | |
|---|---|---|
| CN | 104823165 A | 8/2015 |
| CN | 105074679 A | 11/2015 |
| CN | 106168899 A | 11/2016 |
| WO | WO-2012177597 A1 * | 12/2012 ............... G06F 8/65 |

OTHER PUBLICATIONS

Intellectual Property Office of the P.R. China, International Search Report & Written Opinion issued in corresponding Application No. PCT/CN2017/113792, dated Jun. 27, 2018, 9 pp.

* cited by examiner

UPDATE OF GATEWAY IN SUBSTATION

FIELD

Embodiments of the present disclosure generally relate to the field of electrical power, and more specifically, to updating a gateway in a substation.

BACKGROUND

When updating a configuration or an application in a gateway located in a substation, a service engineer will arrive at the field, connect the gateway to a computer via Wi-Fi or Ethernet cables, and then re-configure the gateway by the computer. For example, if one or more new installed devices are to be connected to the gateway, this process will repeat a couple of times. Most of the substations are restricted and applying an access to the substations may take several weeks or even longer. In more extreme cases, the substation would not allow service engineer to enter at all. Accordingly, there is a need for an improved solution for updating a gateway in a substation.

SUMMARY

In general, example embodiments of the present disclosure provide methods and devices, and systems for updating a gateway in a substation.

In a first aspect, there is provided a method for updating a gateway in a substation. The method comprises receiving, at a gateway from a server, an update package assigned with a first identifier, the update package including at least one of: a configuration associated with at least one monitoring device connected to the gateway; and an application configurable to collect data from the at least one monitoring device; in response to receiving the update package, determining whether the first identifier matches a second identifier of the gateway; and in response to determining that the first identifier matches the second identifier of the gateway, updating the gateway with the received update package.

In some embodiments, receiving the update package comprises: receiving the update package via a secured channel between the gateway and the server.

In some embodiments, the method further comprises in response to receiving the update package, checking integrity of the update package to determine whether the update package has been tampered.

In some embodiments, the method further comprises in response to receiving an update request from a client, sending to the server the received update request and configuration data obtained by the gateway.

In a second aspect, there is provided a method for updating a gateway in a substation, comprising: receiving, at a server from a client, a request for uploading an update package for updating the gateway, the update package being assigned with a first identifier and including at least one of: a configuration associated with at least one monitoring device connected to the gateway; and an application configured to collect data from the at least one monitoring device; verifying an access permission associated with the request; in response to the access permission being verified, sending an authorization to the client; and receiving the update package from the client; and sending the received update package to the gateway for updating the gateway.

In some embodiments, the method further comprises maintaining a legacy update package assigned with the first identifier at the server while obtaining the update package, such that the gateway can be recovered by the legacy update package.

In some embodiments, the method further comprises comparing the update package with the legacy update package to determine a difference between the update package and the legacy update package for debug of the update package.

In some embodiments, verifying the access permission comprises at least one of: verifying that the client is in a list allowable for updating the gateway; verifying that the first identifier assigned to the update package is in a list of registered identifiers; and verifying that a version of the update package is in a list of versions of the update package managed by the server.

In some embodiments, the method further comprises maintaining a legacy update package assigned with the first identifier at the server while obtaining the update package, such that the gateway can be recovered by the legacy update package.

In some embodiments, the method further comprises comparing the update package with the legacy update package to determine a difference between the update package and the legacy update package; debugging the update package based on the difference.

In some embodiments, the method further comprises obtaining the update package comprises: receiving, from a client, a request for uploading the update package assigned with the first identifier; verifying access permission associated with the request; in response to the access permission being verified, sending an authorization to the client; and receiving the update package from the client.

In some embodiments, verifying the access permission comprises at least one of verifying that the client is in a list allowable for updating the gateway; verifying that the first identifier assigned to the update package is in a list of registered identifiers; and verifying that a version of the update package is in a list of versions of the update package managed by the server.

In a third aspect, there is provided a substation. The substation comprises at least one switchgear; at least one monitoring device configured to monitor a status of the at least one switchgear; a gateway connected to the at least one monitoring device and configured to: receive, from a server, an update package assigned with a first identifier, the update package including at least one of: a configuration associated with the at least one monitoring device; and an application configurable to collect data from the at least one monitoring device; in response to receiving the update package, determine whether the first identifier matches a second identifier of the gateway; and in response to determining that the first identifier matches the second identifier of the gateway, update the gateway with the received update package.

In some embodiments, the gateway is communicatively coupled to the server via a secured channel.

In some embodiments, the gateway is configured to: in response to receiving the update package, check integrity of the update package to determine whether the update package has been tampered.

In a fourth aspect, there is provided a system for updating a gateway in a substation, comprising: the gateway configured to: receive an update package assigned with a first identifier, the update package including at least one of: a configuration associated with at least one monitoring device connected to the gateway; and an application configurable to collect data from the at least one monitoring device; in response to receiving the update package, determine whether the first identifier matches a second identifier of the gateway; and in response to determining that the first identifier matches the second identifier of the gateway, updating the gateway with the received update package; and a server communicatively coupled to the gateway configured to: obtain the update package assigned with the first identifier; and send the obtained update package to the gateway for updating the gateway.

In some embodiments, the gateway is communicatively coupled to the server via a secured channel.

In some embodiments, the gateway is further configured to: in response to receiving the update package, check integrity of the update package to determine whether the update package has been tampered.

In some embodiments, the server is further configured to: maintain a legacy update package assigned with the first identifier at the server while obtaining the update package, such that the gateway can be recovered by the legacy update package.

In some embodiments, the server is further configured to: compare the update package with the legacy update package to determine a difference between the update package and the legacy update package; debug the update package based on the difference.

In some embodiments, obtaining the update package comprises: receiving, from a client, a request for uploading the update package assigned with the first identifier; verifying an access permission associated with the request; in response to the access permission being verified, sending an authorization to the client; and receiving the update package from the client.

In some embodiments, verifying the access permission comprises at least one of: verifying that the client is in a list allowable for updating the gateway; verifying that the first identifier assigned to the update package is in a list of registered identifiers; and verifying that a version of the update package is in a list of versions of the update package managed by the server.

When there is a change in the monitoring device, or a new monitoring device(s) is installed in the substation, a service engineer may upload the application and/or configuration on the client to the server and initiate the update process. In this way, the service engineer does not have to arrive at the field, and reconfigure the gateway in the substation. The system also eliminates the potential risk that the service engineer might have in the field, and save the cost of dispatching the service engineer to the field.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
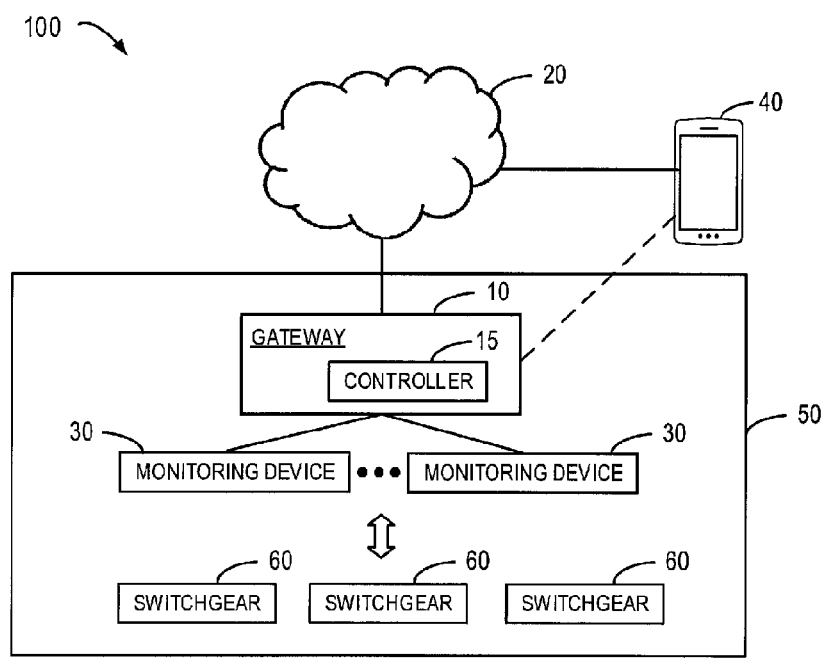
FIG. 1 is a schematic diagram illustrating an environment in which embodiments of the present disclosure can be implemented.

FIG. 1 is a schematic diagram illustrating an environment 100 in which embodiments of the present disclosure can be implemented. It is to be understood that the structure and functionality of the environment 100 are described only for the purpose of illustration without suggesting any limitations as to the scope of the present disclosure. The present disclosure can be embodied with a different structure and/or functionality.

As shown in FIG. 1, the environment 100 includes a gateway 10 connected with one or more monitoring devices 30 arranged in a substation 50. The gateway 10 can communicate with the monitoring devices 30 via one or more protocols including, but not limited to, Modbus, 103, Distributed Network Protocol (DNP), and so on. The monitoring devices 30 are configured to monitor various devices in the substation such as switchgears 60. The monitoring devices 30 may collect real-time data of parameters of the switchgears 60 including but not limited to, temperature, pressure, electric current, and so on. Then, the gateway 10 will receive the data collected by the monitoring devices 20.

The gateway 10 may include a controller 15 that controls the operation of the gateway 10 and carries out the function of the gateway 10. The controller may be implemented by, for example, a processor, a digital signal processor, application specific integrated circuit, or the like. For example, the controller is implemented by an embedded system.

For example, in some embodiments, the controller may execute an application configured to communicate with the monitoring devices 30 and collect data from the monitoring devices based on a configuration associated with the monitoring devices 30 connected to the gateway 10. The configuration may include one or more communication parameters to enable communication between the gateway 10 and the monitoring devices 30. If the gateway 10 communicates with one of the monitoring devices 30 via Modbus, for example, the communication parameters such as Modbus address and Modbus point list may be configured to allow the gateway 10 to communicate with that monitoring device.

The gateway 10 may be assigned with an identifier, for example, a Globally Unique Identifier (GUID). The update package may be assigned with an identifier as well. Upon receiving the update package, the gateway 10 may determine whether the identifier assigned to the update package matches the identifier of the gateway. For example, the gateway 10 may determine whether the two identifiers are the same. If so, the gateway 10 may update or reconfigure itself with the received update package. Otherwise, the gateway 10 will not be updated with the received update package.

The substation 50 may include a great number of types of gateways, and each gateway can only be operated based on its specific application and/or configuration. The robustness and stability of a substation is very critical factor for its operation, especially compared to consumer devices and systems. Conventionally, a service engineer should go to the field to perform the maintenance to ensure the robustness and safety of the substation. By assigning a unique identifier to each gateway, the substation 50 can be maintained by reconfiguring the specific gateway with a specific update package at the cost of computation and storage resources.

The gateway 10 may be connected to the server 20 (for example, a cloud server) via a network such as a cellular network, for example the third generation (3G) of wireless mobile telecommunications technology or the fourth generation (4G) of broadband cellular network technology. In this way, the gateway 10 may receive from the server 20 an update package including at least one of the application and configuration to update the gateway 10. The network between the server 20 and the gateway 10 may a secured connection, for example, implemented by transport layer encryption.

The server 20 may host the update package, which may be uploaded by the client 40 in some embodiments. The client 40 may be a computer or a portable device with an application or software that can communicate with the server 20 via a cellular network or Ethernet. Alternatively, or in addition, the client 40 may run a web browser that can have an access to the server 20 so as to upload the update package to the server 20.

The user (for example, a service engineer) can select a local file such as an update package in the client 40, and upload the file to the server 20, and trigger an update command of the specified gateway 10. Each gateway 10 is associated with a unique identifier, such that the update process can be precisely targeted to the specified gateway 10.

In some embodiments, only the users or service engineers that have an authorization (for example, access permission above a predefined level) can initiate the update process to ensure security of the update process. For example, the server 20 may verify the access permission of the uploader upon receipt of the update package. If the access permission of the uploader is verified, the server 20 will send an authorization to the client 40. The client 40 will then send the update package to the server 20. The server 20 may verify the access permission by determining whether the client is in a list allowable for updating the gateway 10, the identifier assigned to the update package is in a list of registered identifiers, and/or the version of the update package is in a list of versions of the update package managed by the server.

In addition, after receiving the update package, the gateway 10 will check the integrity of the update package, so as to make sure that the update package has not been tampered or otherwise endanger the operation of the gateway 10 and even the substation. The gateway 10 may check the integrity of the update package by Secure Hash Algorithm SHA256 and/or Message Digest Algorithm MD5.

In some embodiments, the server 20 may actively push an update package to the gateway 10. For example, if a new application is released to support a new function, the server 20 may push the new application to the gateway 10.

In some embodiments, the client 40 may only have the access to the gateway 10 and does not have an access to the server 20. In this way, the client 40 may be connected to the gateway 10 via a local area network such as Wi-Fi and send configuration data such as parameters about the configuration change to the gateway 10. For example, when one or more monitoring devices 30 are installed in the substation and connected to the gateway, the client 40 may send the device information to the gateway 10, such that the gateway 10 can send an update request to the server 20. When receiving the update request, the server 20 will send the received configuration data or device information to a service engineer. The service engineer may design and complete an update package and push the package to the gateway 10.

The gateways in the substation 50 may each have different configurations. Thus, the server will manage the packages for each gateway with legacy support. For example, the server may host legacy packages for each gateway, such that the application and/or configuration can be rolled back to an earlier version. The electrical system has a very high demand for robustness and reliability and may have an update demand for the old devices, for example. The server 20 may manage the update package for each gateway and the updated device can properly operate without compatibility problem. In addition, if the updated device cannot properly operate, the gateway 10 can be easily rolled back to the previous configuration or application. The update package may also be compared with the legacy update package to determine the difference between the update package and the legacy update package. In this way, the service engineer can debug the update package based on the difference.

In some embodiments, when the gateway 10 is installed in the substation 50 and connected to the server 20, or when the configuration and/or application for the gateway 10 have changed, the gateway 10 will send the configuration and/or version information about the application to the server as a backup. The configuration and/or version information about the application may be stored in a field associated with the identifier of the gateway 10, for example, a GUID. Then, if the gateway 10 fails for some reason, the gateway 10 may be rolled back via the configuration and/or application in the server. A new gateway may also be installed and operated based on the backup in the cloud.

When there is a change in the monitoring devices 20, or a new monitoring device(s) is added to the substation, a service engineer may upload the application and/or configuration on the client 40 to the server 20 and initiate the update process. In this way, the service engineer does not have to arrive at the field, and reconfigure the gateway 10 in the substation. The potential risk for the service engineer can be eliminated, and the cost of dispatching the service engineer can be saved.

FIG. 1 illustrates that the gateway 10 can be updated in a point-to-point way by the server 20. Alternatively, or in addition, a number of gateways 10 may be arranged in an electrical station and the gateways 10 may be updated in a point-to-multipoint way. For example, the server 20 can send the update package to the gateways 10 and update the gateways 10 simultaneously. The number of gateways 10 may be associated with a range of identifiers with a common field, for example.

Figure 2:
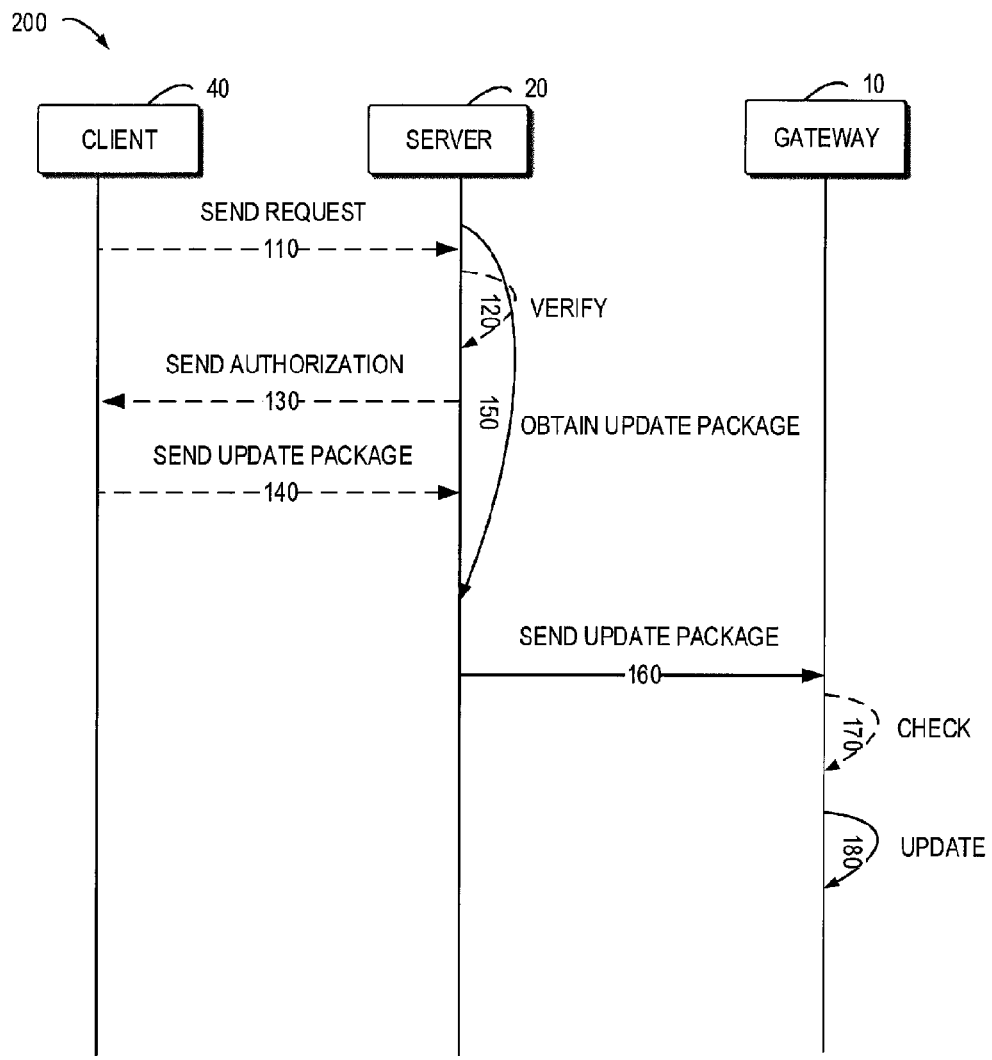
FIG. 2 is an interaction diagram illustrating a method of updating a gateway in a substation in accordance with embodiments of the present disclosure.

FIG. 2 is an interaction diagram 200 of updating a gateway 10 in a substation in accordance with embodiments of the present disclosure. It is to be understood that the acts denoted by the dashed lines are optional.

The server 20 obtains (150) an update package assigned with an identifier. The update package may include a configuration associated with at least one monitoring device connected to the gateway. Alternatively, or in addition, the update package may include an application configured to collect data from the at least one monitoring device. For example, the application is configured to communicate with the monitoring devices 30 and collect data from the monitoring devices based on a configuration associated with the monitoring devices 30 connected to the gateway 10. The configuration may include one or more communication parameters to enable communication between the gateway 10 and the monitoring devices 30. If the gateway 10 communicates with one of the monitoring devices 30 via Modbus, for example, the communication parameters such as Modbus address and Modbus point list may be configured to allow the gateway 10 to communicate with that monitoring device. For example, a service engineer can design and complete such an update package at the server 20.

In some embodiments, the server 20 may receive the update package from another device, for example, the client 40. A user (for example, a service engineer) may design and complete an update package in accordance with requirements in the substation, for example. The client 40 sends (110) a request for uploading the update package to the server 20 via a network such as Ethernet. The server 20 verifies (120) access permission associated with the request. For example, if the client is in a list allowable for updating the gateway 10, the identifier assigned to the update package is in a list of registered identifiers, and/or the version of the update package is in a list of versions of the update package managed by the server, the access permission will be verified. If the access permission is verified, the server 20 sends (130) an authorization to the client 40. The client 40 will send (140) the update package to the server 20.

Alternatively, the client 40 can upload the update package to the server 20 regardless of the access permission. In this case, the server 20 may verify the access permission of the uploader upon receipt of the update package. If the access permission of the uploader is verified, the server 20 will tag the update package as legitimate for the subsequent update process. Otherwise, the server 20 may delete the uploaded update package and terminate the update process.

The server 20 at 160 sends the update package to the gateway 10 to enable the update process. The gateway 10 may download the update package from the server 20 and store the update package in its local storage.

The gateway 10 at 180 updates the gateway 10 based on the received update package. For example, if an update configuration is received, the gateway 20 may update the configuration only so as to support new monitoring devices, for example.

As described above, the gateway 10 may be assigned with an identifier, for example, a Globally Unique Identifier (GUID). The update package may be assigned with an identifier as well. Upon receiving the update package, the gateway 10 may determine whether the identifier assigned to the update package matches the identifier of the gateway 10. If so, the gateway 10 may update or reconfigure itself with the received update package. Otherwise, the gateway 10 will not be updated.

In some embodiments, the gateway 10 at 160 may check the integrity of the update package, for example, whether the update package has been tampered or the like. In this way, the security of update process will be further improved.

Figure 3:
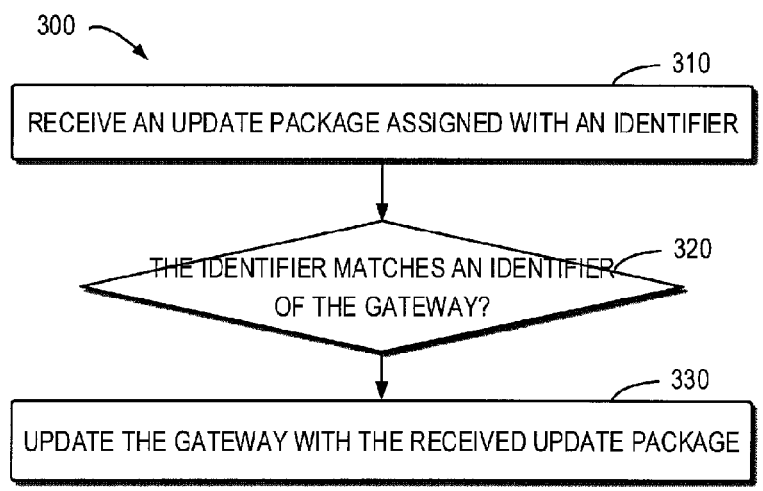
FIG. 3 is a flowchart illustrating a method of updating a gateway in a substation in accordance with embodiments of the present disclosure.

FIG. 3 is a flowchart illustrating a method 300 of updating a gateway 10 in a substation in accordance with embodiments of the present disclosure. The method 300 is implemented at the gateway 10. For example, in some embodiments, the method 300 may be carried out by the controller 15 of the gateway 10.

At block 310, the gateway 10 receives an update package assigned with an identifier. The update package includes a configuration associated with at least one monitoring device connected to the gateway and/or an application configurable to collect data from the at least one monitoring device.

In some embodiments, the gateway 10 receives the update package via a secured channel between the gateway 10 and the server 20. For example, the secured channel may be implemented by a transport layer encryption. In some embodiments, when receiving the update package, the gateway 10 may check integrity of the update package so as to improve the security of the update process.

In some embodiments, the gateway 10 may receive an update request from a client 40. The gateway 10 will send to the server 20 the received update request and configuration data obtained by the gateway. Alternatively, or in addition, the gateway 10 may receive the update request together with the device information from the client 40. In this way, the gateway 10 will sent to the server 20 the received update request and the device information.

At block 320, the gateway 10 may determine whether the identifier assigned to the update package matches the identifier of the gateway. If yes, the method 300 proceeds to block 330. At block 330, the gateway 10 may update or reconfigure the gateway 10 with the received update package. For example, if a new monitoring device is installed in the substation, the configuration may be updated to allow the gateway 10 to support the new monitoring device.

Figure 4:
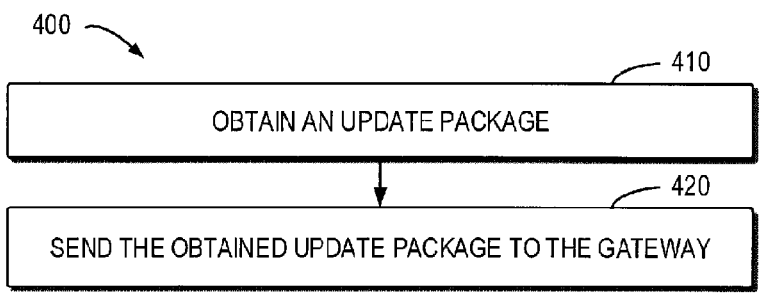
FIG. 4 is a flowchart illustrating a method of updating a gateway in a substation in accordance with embodiments of the present disclosure.

FIG. 4 is a flowchart illustrating a method 400 of updating a gateway 10 in a substation in accordance with embodiments of the present disclosure. The method 400 is implemented at the server 20, for example, a cloud server. The cloud may be a private cloud to enhance security of the update process. In particular, the server 20 may include a processing unit and a storage medium having instructions stored thereon for execution by the processing unit. The instructions, when executed by the processing unit, cause the device to carry out the method 400.

At block 410, the server 20 obtains an update package including a configuration associated with at least one monitoring device 30 connected to the gateway 10 and/or an application configured to collect data from the at least one monitoring device 30. The update package may be completed at the server 20 or uploaded to the server 20. For example, the update package may be uploaded by the client 40. In some embodiments, the server 20 receives a request for uploading the update package to update the gateway 10 from the client 40. The server 20 verifies access permission associated with the request. If the access permission is verified, the server 20 sends an authorization to the client 40 and receives the update package from the client 40.

In some embodiments, the server 20 will maintain a legacy update package while obtaining the update package.

In this way, the application and/or configuration of the gateway 10 may be rolled back to an earlier version.

At block 420, the server 20 sends the obtained update package to the gateway 10 for updating the gateway 10. In some embodiments, the update package is send via a secured channel between the gateway 10 and the server 20.

When there is a change in the monitoring devices 20, or a new monitoring device(s) is installed in the substation, a service engineer may upload the application and/or configuration on the client 40 to the server 20 and initiate the update process. As a result, the service engineer does not have to arrive at the field, and reconfigure the gateway 10 in the substation. In this way, the potential risk in the field may be eliminated and the cost of dispatching the service engineer may also be saved.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for updating a gateway in a substation, comprising:
   receiving, at the gateway from a server, an update package assigned with a first identifier, the update package including at least one of:
      a configuration data associated with at least one monitoring device connected to the gateway; and
      an application configurable to collect data from the at least one monitoring device;
   in response to receiving the update package, determining whether the first identifier matches a second identifier of the gateway; and
   in response to determining that the first identifier matches the second identifier of the gateway, updating the gateway with the update package;
   wherein the second identifier includes a list of registered identifiers, and wherein the first identifier is a registered identifier in the list of registered identifiers.

2. The method of claim 1, wherein receiving the update package comprises:
   receiving the update package via a secured channel between the gateway and the server.

3. The method of claim 1, further comprising:
   in response to receiving the update package, checking integrity of the update package to determine whether the update package has been tampered.

4. The method of claim 1, further comprising:
   receiving, at the gateway from a client, an update request and the configuration data; and
   in response to receiving the update request from the client, sending to the server the update request and the configuration data obtained by the gateway.

5. A substation comprising:
   at least one switchgear;
   at least one monitoring device configured to monitor a status of the at least one switchgear; and
   a gateway connected to the at least one monitoring device and configured to:
      receive, from a server, an update package assigned with a first identifier, the update package including at least one of:
         a configuration data associated with the at least one monitoring device; and
         an application configurable to collect data from the at least one monitoring device;
      in response to receiving the update package, determine whether the first identifier matches a second identifier of the gateway; and
      in response to determining that the first identifier matches the second identifier of the gateway, update the gateway with the received update package;
   wherein the second identifier includes a list of registered identifiers, and wherein the first identifier is a registered identifier in the list of registered identifiers.

6. The substation of claim 5, wherein the gateway is communicatively coupled to the server via a secured channel.

7. The substation of claim 5, wherein the gateway is configured to:
   in response to receiving the update package, check integrity of the update package to determine whether the update package has been tampered.

8. A system for updating a gateway in a substation, comprising:
   the gateway configured to:
      receive an update package assigned with a first identifier, the update package including at least one of:
         a configuration data associated with at least one monitoring device connected to the gateway; and
         an application configurable to collect data from the at least one monitoring device;
      in response to receiving the update package, determine whether the first identifier matches a second identifier of the gateway; and
      in response to determining that the first identifier matches the second identifier of the gateway, updating the gateway with the received update package; and
   a server communicatively coupled to the gateway configured to:
      obtain the update package assigned with the first identifier; and
      send the obtained update package to the gateway for updating the gateway;
   wherein the second identifier includes a list of registered identifiers, and wherein the first identifier is a registered identifier in the list of registered identifiers.

9. The system of claim 8, wherein the gateway is communicatively coupled to the server via a secured channel.

10. The system of claim 8, wherein the gateway is further configured to:
    in response to receiving the update package, check integrity of the update package to determine whether the update package has been tampered.

11. The system of claim 8, wherein the server is further configured to:
    maintain a legacy update package assigned with the first identifier at the server while obtaining the update package, such that the gateway can be recovered by the legacy update package.

12. The system of claim 11, wherein the server is further configured to:
    compare the update package with the legacy update package;
    determine a difference between the update package and the legacy update package; and
    debug the update package based on the difference.

13. The system of claim 8, wherein obtaining the update package comprises:
    receiving, from a client, a request for uploading the update package assigned with the first identifier;

verifying an access permission associated with the request;

in response to the access permission being verified, sending an authorization to the client; and receiving the update package from the client.

14. The system of claim 13, wherein verifying the access permission comprises at least one of:

verifying that the client is in a list allowable for updating the gateway;

verifying that the first identifier assigned to the update package is in a list of registered identifiers; and verifying that a version of the update package is in a list of versions of the update package managed by the server.

\* \* \* \* \*